Sept. 24, 1935.  L. ECKLER  2,015,261

DIAPHRAGM FOR CAMERAS

Filed Dec. 12, 1932  2 Sheets—Sheet 1

INVENTOR.
LEOPOLD ECKLER.
BY Philip S. Hopkins
ATTORNEY.

Sept. 24, 1935.  L. ECKLER  2,015,261
DIAPHRAGM FOR CAMERAS
Filed Dec. 12, 1932  2 Sheets-Sheet 2
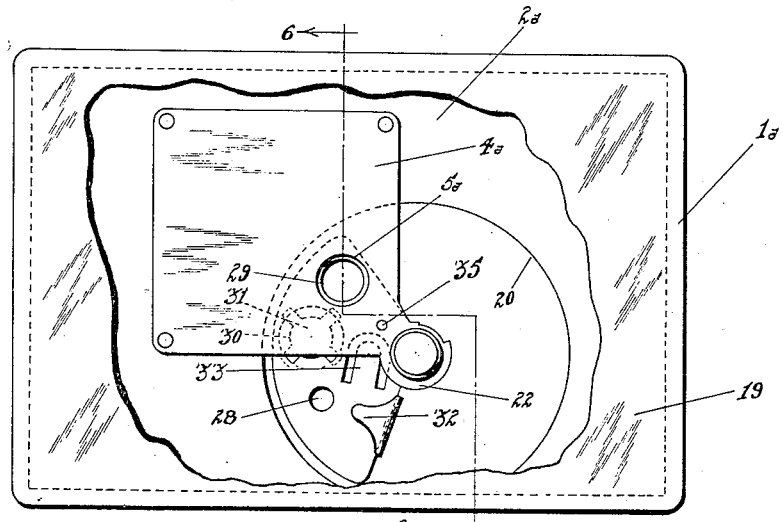
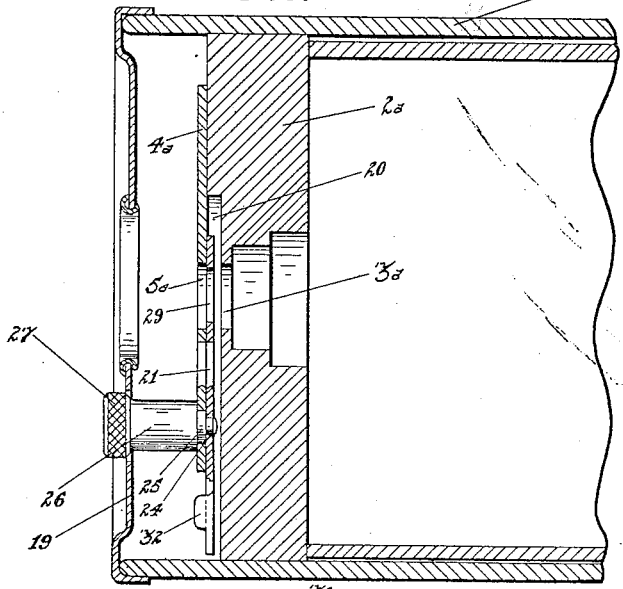
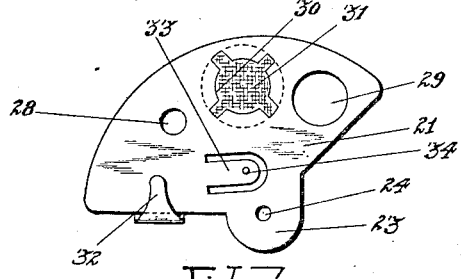
INVENTOR.
LEOPOLD ECKLER.
BY *Philip S. Hopkins*
ATTORNEY.

Patented Sept. 24, 1935

2,015,261

UNITED STATES PATENT OFFICE 2,015,261

DIAPHRAGM FOR CAMERAS

Leopold Eckler, Binghamton, N. Y., assignor to Agfa Ansco Corporation, Binghamton, N. Y., a corporation of New York Application December 12, 1932, Serial No. 646,775

5 Claims. (Cl. 95—81.5)

My invention relates to an improvement in diaphragms for cameras and has for its particular object the provision of a diaphragm provided with a plurality of apertures of varying sizes and one of which is provided with a light filter.

It is well known and common practice to provide photographic cameras with diaphragms of one kind or another whereby the effective aperture through which exposures can be made may be changed to suit varying light conditions. I have provided such a diaphragm, improved by the provision of an aperture having a light filter covering the same whereby the effectiveness and usefulness of the diaphragm is enlarged respecting the making of pictures under varying light conditions.

At the present time the sensitivity of most photographic films has been increased considerably. The result is that in brilliant light and with the usual diaphragm aperture for "instantaneous" exposures, it frequently occurs that the film is overexposed. To help take care of this problem I have provided a diaphragm provided with a relatively small aperture for "time" exposures and a relatively large aperture for "instantaneous" exposures, and a third aperture of substantially the same size as the last named "instantaneous" aperture, provided with a light filter whereby in brilliant light this aperture may be used with safety against overexposure.

Other objects and advantages in details of construction and arrangement of parts will be apparent as the description proceeds, reference now being had to the figures of the accompanying drawings forming a part of this application and wherein like reference numerals indicate like parts.

In the drawings:

Figure 5 is a front view of a camera with the front board thereof broken away for clearness, and illustrating a modified form of diaphragm embodying my invention.

Figure 6 is a cross sectional view taken on the line 6—6 of Figure 5.

Figure 7 is a detail view of this modified form of diaphragm.

Figure 1:
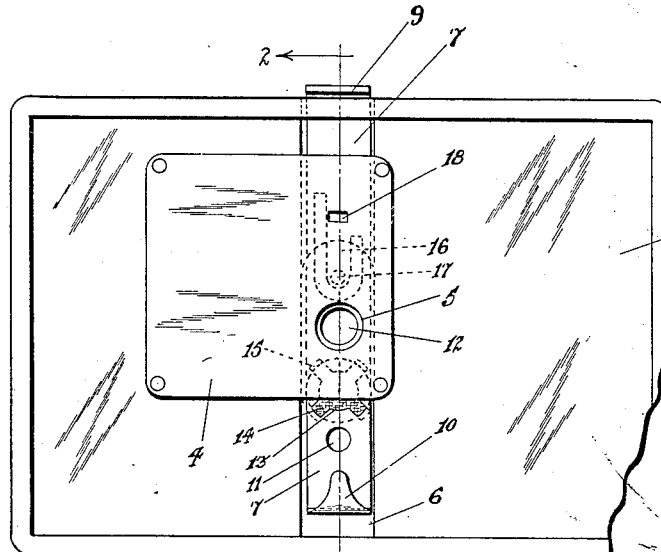
Figure 1 is a front view of a box camera with the front cover removed, showing my improved diaphragm in operative position.

I have illustrated in the drawings and will describe herein two types of diaphragms embodying my invention and it will be understood that the invention is equally applicable to other types as well.

The reference character 1 refers to a camera body such as provided for an ordinary box camera. Positioned adjacent the front end of the camera casing 1 is a lens board or partition 2 provided with an aperture 3 through which exposures are made. Overlying this aperture 3 and secured to the partition 2 in any suitable manner is a plate 4 provided with an aperture 5 in alignment with the aperture 3. This plate 4 may carry the shutter for the camera, or other operating parts, all of which have been omitted for clearness of illustration.

In the form of the invention shown in Figures 1-4 inclusive, the partition 2 is provided in its front face with a channel groove 6 extending completely across the partition and in registry with the aperture 3. Slidably mounted in this groove 6 and guided and retained in such groove by the plate 4, is a slidable diaphragm 7, one end of which extends through a slot 8 in the camera casing 1 and projects to the outside of the camera where it is provided with a turned over finger piece 9 for easy manipulation. This finger piece also limits the inward movement of the diaphragm sliding.

Figure 2:
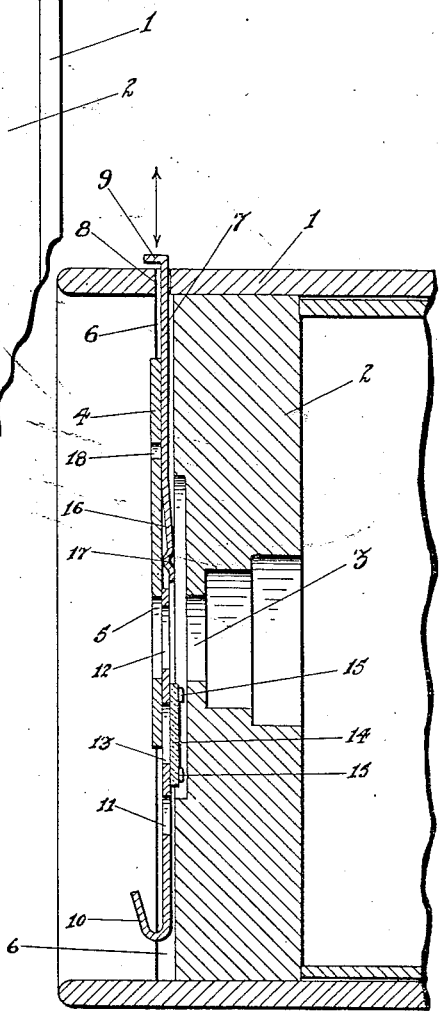
Figure 2 is a cross sectional view taken on the line 2—2 of Figure 1.

The opposite end of the diaphragm slide 7 is bent, as shown clearly in Figure 2 at 10 to provide a hook member which is adapted to engage with the edge of the plate 4 when the diaphragm is pulled outwardly, thus limiting such outward movement of the diaphragm.

The diaphragm is provided with a plurality of apertures, three being illustrated herein although it will be understood that more may be provided if the type of camera and circumstances render it advisable. The smallest aperture 11 is for "time" exposures and one of the relatively large apertures 12 is for "instantaneous" exposures. These are the common apertures provided on a diaphragm.

I have provided a third aperture 13 of the same size as the aperture 12 and covered by a light filter 14 which may be a piece of glass, celluloid, or other transparent material of suitable color, as for instance, yellow, whereby some of the rays of light may be absorbed in passing therethrough and thus lessening the light intensity and changing the light value as it passes to the film in the camera.

This light filter 14 may be secured to the diaphragm slide in any suitable manner such as by striking out retaining fingers 15 from the diaphragm material, which embrace and hold the filter in position.

In the form of diaphragm just described, the apertures are so arranged that when the diaphragm is pushed inwardly to the limit of its movement, the usual snapshot aperture 12 is in alignment with the exposure aperture 3, and the aperture 5 in the plate 4, thus providing the effective aperture for exposure. When the diaphragm slide is pulled outwardly a short distance the filter aperture 13 registers with the exposure apertures and this registering position is determined and indicated by means of a spring finger 16 struck from the body of the diaphragm itself and provided at its lower end with a dented portion 17 which is adapted to engage within a small opening 18 provided in the plate 4 when the aperture 13 is in proper alignment. The spring finger 16 with its dented portion 17 provides a resilient friction lock for the diaphragm in such position and when not in such position the portion 17 rides on the back side of the plate 4 and thus provides a friction sufficient to prevent the diaphragm from moving from its adjusted position unless manipulated by the finger piece 9.

Figure 3:
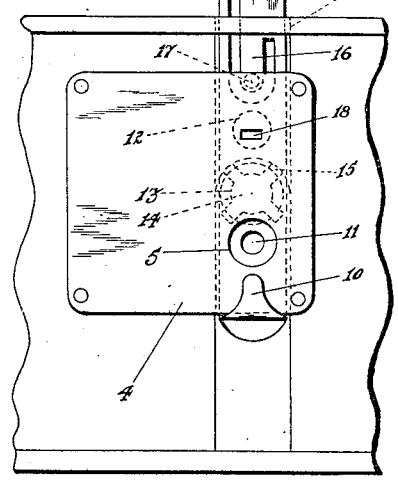
Figure 3 is a detail view of the diaphragm in operative position but in another position from that shown in Figure 1.
Figure 4:
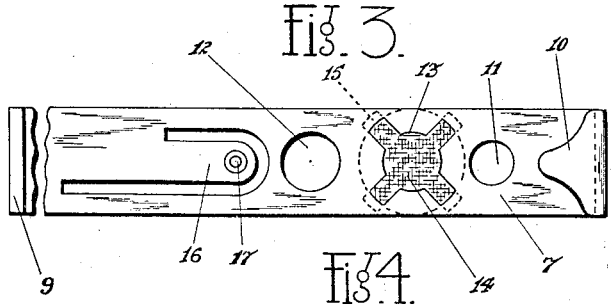
Figure 4 is a detail view of the diaphragm itself showing one form which this diaphragm may take.

When the diaphragm is pulled outwardly its full extent, that is, with the hook portion 10 engaging with the plate 4 as shown in Figure 3, the aperture 11 is in alignment with the exposure apertures.

Obviously therefore, the user of a camera equipped with this diaphragm has the selection of three apertures for making his exposures and with the light filter provided on the diaphragm itself, in conjunction with one of the apertures thereof, the use of a separate or independent color filter over the lens of the camera, which is difficult with a box camera, is rendered unnecessary.

In the form shown in Figures 5, 6 and 7, the invention is the same except that the diaphragm is of a pivoted type instead of the sliding type just described.

In this form the camera body is indicated at 1a, the partition or lens board at 2a, the exposure aperture in the partition at 3a, the shutter plate at 4a, and the front cover of the camera is shown at 19.

In this form the front face of the partition 2a is provided with a relatively large circular recess 20 within which, and partially in back of the plate 4a, is mounted for pivotal movement the diaphragm 21 which may be of the segment form shown clearly in Figure 7. This diaphragm is pivoted upon the plate 4a at one corner thereof, such corner being extended as at 22 to provide a pivot bearing for the diaphragm. The diaphragm is provided with an ear 23 having an opening 24 therein, within which is fastened a pin 25 carried by a finger piece 26 which extends outwardly through an opening in the front wall 19 of the camera and is knurled at its end as at 27, whereby the same may be easily turned to rotate the diaphragm 21 upon its pivot.

This diaphragm is provided with the relatively small "time" aperture 28 and the relatively large "instantaneous" aperture 29. It is likewise provided with a second relatively large aperture 30 of substantially the same size as the aperture 29, covered with a color filter 31, which may be of the same type as before described and fastened to the diaphragm in any suitable manner.

One edge of the diaphragm segment 21 is provided with a hook portion 32 adapted to engage with one edge of the plate 4a when the diaphragm is turned to the right in Figure 5, thus limiting such movement in that direction. The diaphragm 21 is also provided with a spring finger 33 struck from the body of the diaphragm and provided with an indented portion 34 adapted for engagement with an opening 35 provided in the plate 4a whereby to frictionally retain the diaphragm in its intermediate position. This spring finger is adapted to engage the under side of the plate 4a at all times and thus retain the diaphragm in its adjusted position. The diaphragm is limited in its movement to the left in Figure 6 by engaging the bottom of the camera casing 1a.

When in its left hand position as shown in Figure 5, the aperture 29 is in registry with the exposure aperture 3a in the partition and the aperture 5a in the plate 4a. When in its intermediate position with the spring finger engaging within the opening 35, the aperture 30 with the light filter thereover is in proper registry with the exposure apertures. When the diaphragm is turned to its right hand position, that is, with the hook portion 32 engaging the edge of the plate 4a, the aperture 28 is in registering position with the exposure apertures.

From the foregoing it will be seen that I have provided a combined diaphragm and light filter for cameras in one unit.

Of course, changes may be made by way of detail without departing from the spirit and scope of my invention. I do not limit myself, therefore, to the exact form herein shown and described other than by the appended claims.

I claim:

1. In combination, a photographic camera, an adjustable diaphragm provided with a relatively small aperture and a relatively large aperture, and a light filter carried by said diaphragm and covering said last named aperture.

2. In combination, a photographic camera, an adjustable diaphragm provided with a relatively small aperture and a plurality of relatively larger apertures, and a light filter carried by said diaphragm and covering one of said larger apertures.

3. In combination, a photographic camera, an adjustable diaphragm provided with a plurality of apertures certain of said apertures differing in size from the others, a light filter carried by said diaphragm and covering one of said apertures, means on said diaphragm cooperating with certain parts of said camera, for limiting the movement of said diaphragm, and a resilient member on said diaphragm for frictionally retaining said diaphragm in adjusted position.

4. In combination, a photographic camera, an adjustable diaphragm provided with a plurality of apertures certain of said apertures differing in size from the others, a light filter carried by said diaphragm and covering one of said apertures, means on said diaphragm cooperating with certain parts of said camera, for limiting the movement of said diaphragm, and a resilient member on said diaphragm for frictionally retaining said diaphragm in adjusted position, said resilient means comprising a tongue struck from said diaphragm and having an indented portion engaging a part of said camera.

5. In combination, a photographic camera, an adjustable diaphragm provided with a plurality of apertures, certain of said apertures differing in size from the others, a light filter carried by said diaphragm and covering one of said apertures, means on said diaphragm cooperating with certain parts of said camera, for limiting the movement of said diaphragm, and a resilient member on said diaphragm for frictionally retaining said diaphragm in adjusted position, said resilient means comprising a tongue struck from said diaphragm and having an indented portion engaging a part of said camera, said camera part having an opening for frictionally receiving said indented portion in one position of said diaphragm.

LEOPOLD ECKLER.